United States Patent
Lin et al.

(10) Patent No.: US 7,466,997 B2
(45) Date of Patent: Dec. 16, 2008

(54) PORTABLE WIRELESS DEVICE

(75) Inventors: Huei Lin, Taoyuan Shien (TW);
Nen-Yen Wu, Bade (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1099 days.

(21) Appl. No.: 10/421,387

(22) Filed: Apr. 23, 2003

(65) Prior Publication Data
US 2004/0127248 A1    Jul. 1, 2004

(30) Foreign Application Priority Data
Dec. 25, 2002    (TW) .............................. 91137377 A

(51) Int. Cl.
*H01Q 1/24*    (2006.01)
*H01Q 1/48*    (2006.01)
(52) U.S. Cl. .................. 455/575.7; 455/575.1; 343/702; 343/745; 343/750; 343/823
(58) Field of Classification Search .................. 455/557, 455/575.7, 575.1; 343/702, 750, 823, 745; 333/134, 202, 195
See application file for complete search history.

(56) References Cited

U.S. PATENT DOCUMENTS

| | | | | |
|---|---|---|---|---|
| 5,657,028 A | * | 8/1997 | Sanad .................. | 343/700 MS |
| 5,914,690 A | * | 6/1999 | Lehtola et al. .............. | 343/702 |
| 6,304,219 B1 | * | 10/2001 | Rothe .................. | 343/700 MS |
| 6,373,351 B1 | * | 4/2002 | Kubota et al. ................ | 333/134 |
| 6,384,698 B1 | * | 5/2002 | Hayashi et al. ............. | 333/195 |
| 6,452,554 B1 | * | 9/2002 | Aoyama et al. ............. | 343/702 |
| 6,677,902 B2 | * | 1/2004 | Akiyama et al. ...... | 343/700 MS |
| 6,836,248 B2 | * | 12/2004 | Fukushima et al. ... | 343/700 MS |
| 7,072,690 B2 | * | 7/2006 | Shin et al. .................... | 455/557 |
| 2001/0050638 A1 | * | 12/2001 | Ishitobi et al. ........ | 343/700 MS |
| 2002/0065902 A1 | * | 5/2002 | Janik et al. .................. | 709/219 |

FOREIGN PATENT DOCUMENTS

TW            466827         12/2001

* cited by examiner

*Primary Examiner*—George Eng
*Assistant Examiner*—Brandon J Miller
(74) *Attorney, Agent, or Firm*—Thomas, Kayden, Horstemeyer & Risley

(57) ABSTRACT

A portable wireless device operating within a specific bandwidth is provided. Conductor elements such as the circuit board, the battery, the card slot, the multimedia socket and the resonator are installed inside the housing of a portable wireless device. The body of the resonator is made of dielectric material with the positive electrode and the negative electrode being formed on the two lateral sides of the dielectric material. The positive electrode and the negative electrode have a positive polarity regulating piece and a negative polarity regulating piece respective with capacitance effect existing between the positive and the negative regulating pieces regulating both the impedance matching and the phase thereof. The resonator, when operating within the range of resonance frequency, is able to couple the energy to conductor elements and generate a radiation field for the portable wireless device together with the conductor elements.

24 Claims, 5 Drawing Sheets

PORTABLE WIRELESS DEVICE

This application claims the benefit of Taiwan application Ser. No. 091137377, filed Dec. 25, 2002.

BACKGROUND OF THE INVENTION

1. Field of the Invention

The invention relates in general to a wireless device, and more particularly, to a portable wireless device.

2. Description of the Related Art

In recent years, the electronic industry has gained a rapid and prosperous growth. Apart from an attractive outer appearance, which is smart, light and thin, the wireless communication function of electronic products is also highly emphasized by the manufacturers. The wireless communication function for electronic products such as the notebook computer, the mobile phone, and the personal digital assistant (PDA) has been severely tested in the market and has virtually become an important function indicator. Especially, the PDA, which has long been appealing for its compact size and wireless network function, has become the focus of research and development for the manufacturers hoping that their products can get ahead in the market.

In application of wireless devices, the antenna is a very important element. Since the functional characteristics of an antenna directly affect the quality of signal transceiving, many research institutes have poured in considerable resources hoping the operating characteristics of the antenna can be improved.

Take the PDA for example; the design of an internal antenna has become a mainstream concept. However, the quality of signal transceiving is degraded for the antenna is enveloped inside the casing. To make it clearer, there are inevitably a number of conductor elements such as the circuit board, the battery, the card slot (memory card or I/O card for instance) and the multimedia socket (microphone socket or earphone socket for instance) being installed inside a PDA. However, these conductor elements will reflect or absorb wireless signals, therefore directly affect the transceiving characteristics of antenna signals. In other words, the conventional antenna might function properly without conductor elements being installed nearby. When the antenna is installed into the casing, the operating characteristics and wireless signal transceiving quality of the antenna will be severely affected due to the influence of working environments. This is not a particular problem that occurs to the design of PDA only; any portable device, a mobile phone or a notebook computer for instance, will face the same problem as long as an internal antenna is installed therein. Therefore, how to improve the design of the internal antenna to avoid the negative influence on signal transceiving caused by conductor elements and further seek to improve wireless signal transceiving quality by means of these conductor elements have become an imminent issue to be resolved.

SUMMARY OF THE INVENTION

It is therefore an object of the invention to provide a portable wireless device, which, by means of the resonator and conductor elements installed therein, generates the necessary radiation field.

According to the object of the present invention, a portable wireless device is disclosed below.

A portable wireless device operating within a specific bandwidth is provided. Conductor elements such as the circuit board, the battery, the card slot, the multimedia socket and the resonator are installed inside the housing of a portable wireless device. The body of the resonator is made of dielectric material with the positive electrode and the negative electrode being formed on the two sides of the dielectric material. The positive electrode and the negative electrode have a positive polarity regulating piece and a negative polarity regulating piece respective with capacitance effect existing between the positive and the negative regulating pieces regulating both the impedance matching and the phase thereof. The resonator, when operating within the range of resonance frequency, is able to couple the energy to conductor elements and generate a radiation field for the portable wireless device together with the conductor elements.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
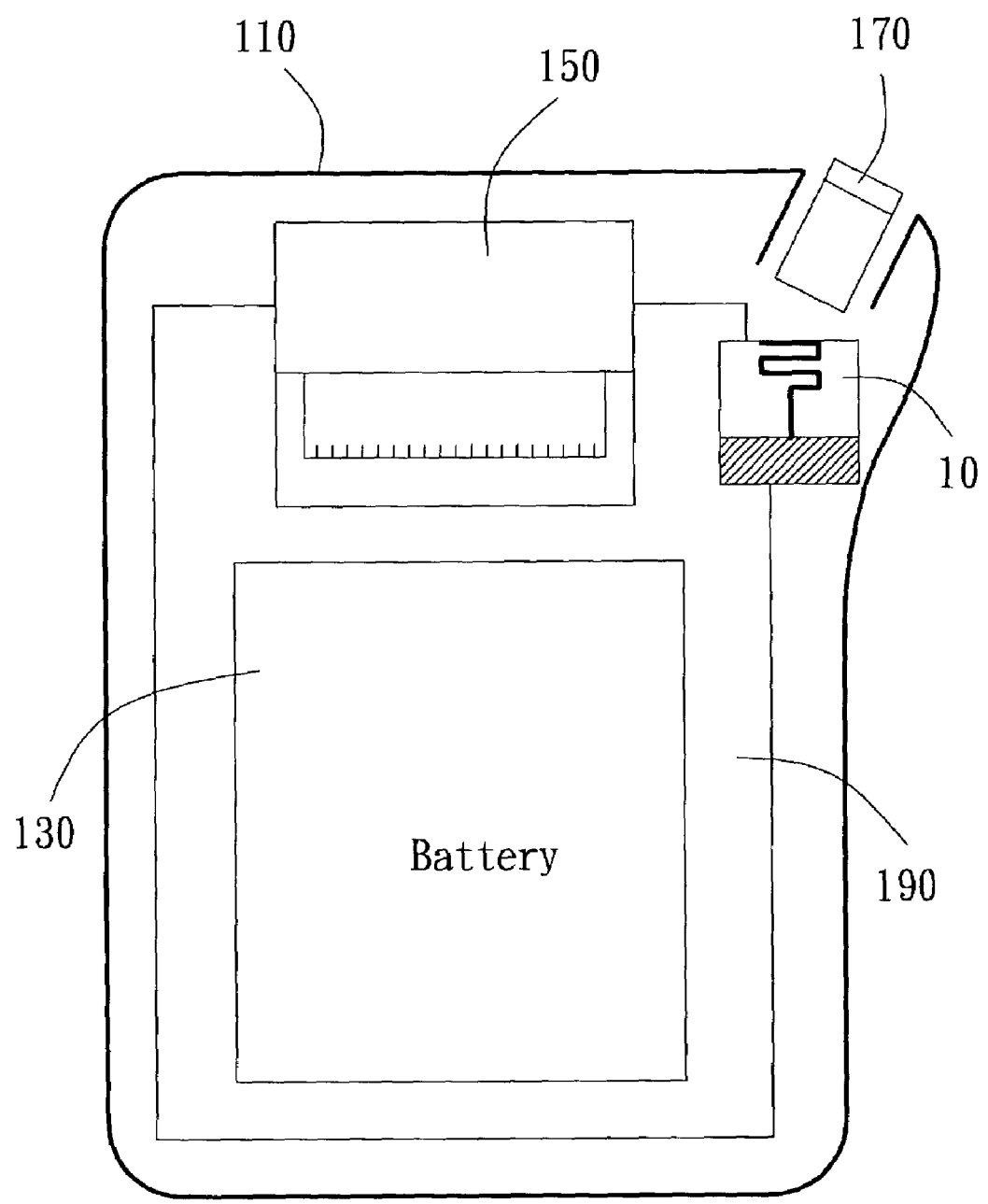
FIG. 1 is a schematic diagram of a portable wireless device according to the preferred embodiment of the invention.

There are a great variety of portable wireless device with wireless transmission functions, for example, the personal digital assistant (PDA), the mobile phone or the notebook computer. These portable wireless devices are designed to operate within a bandwidth including the frequency applicable to the Bluetooth or the frequency applicable to the antenna of IEEE 802.11b specification, 2.4 GHz~2.5 GHz for instance. Please refer to FIG. 1, a schematic diagram of a portable wireless device according to the preferred embodiment of the invention. In the present embodiment, the portable wireless device 100 is a PDA comprising a housing 110, with a battery 130, a card slot 150, a multimedia socket 170, a motherboard 190 and a resonator 10 being installed therein. The card slot 150 can be a memory card slot or an I/O card slot while the multimedia socket 170 can be a microphone socket or an earphone socket. Due to the design of an internal antenna, the resonator 10 is installed inside the housing 110. It is noteworthy that the layout for the battery 130, the card slot 150, the multimedia socket 170, the motherboard 190 and the resonator 10 shown in FIG. 1 is only for the purpose of exemplification and is not limited thereto.

The design of the present invention incorporates one of the characteristics of the resonator 10: when operating within the resonance bandwidth, the resonator 10 will couple energy to conductor elements like the battery 130, the card slot 150, the multimedia socket 170 and the motherboard 190 to generate a radiation field for the portable wireless device 100. In other words, all of the resonator 10, the battery 130, the card slot 150, the multimedia socket 170 and the motherboard 190 are part of an antenna element in a broad sense. During the design, the engineers need to consider the operating characteristics of the resonator 10, which has been equipped with a basic configuration of an antenna, as well as the effects generated by each conductor element in order to achieve the most efficient radiation pattern.

During the design, the engineers can configure the structure of an antenna using software called the "high frequency structure simulator" (HFSS) to simulate the characteristics of a radiation field via computer simulation. In order that the simulated results can be as close to actual values as possible, the structure of the resonator 10 is determined first with the size and location of other conductor elements like the battery 130, the card slot 150, the multimedia socket 170 and the motherboard 190 being added later according to the actual layout of the product. Since the housing 110 can have a conductive coating, the housing 110 can also be regarded as a conductor element. The response of the structure of a conductor element to resonance frequency when the resonator 10 is excited can be simulated using simulation software. In the course of simulation, the size and location for each conductor element can be regarded as fixed and known data, so the radiation pattern can be adjusted and the integral frequency response be optimized by adjusting the structure of the resonator alone. The structure of the resonator 10 and the adjusting method thereof are disclosed below.

Figure 2:
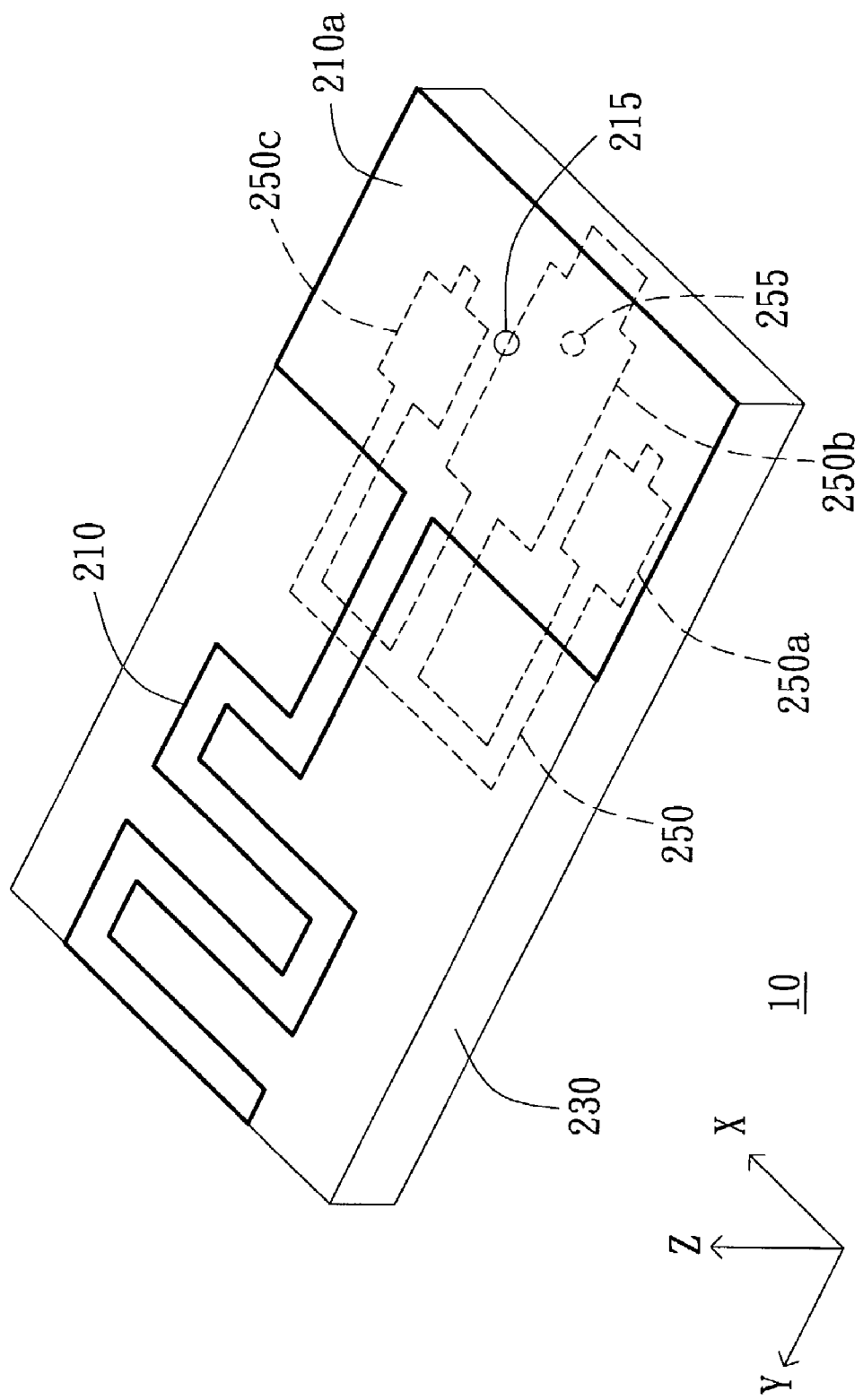
FIG. 2 is a structural diagram for the resonator illustrated in FIG. 1.
Figure 3:
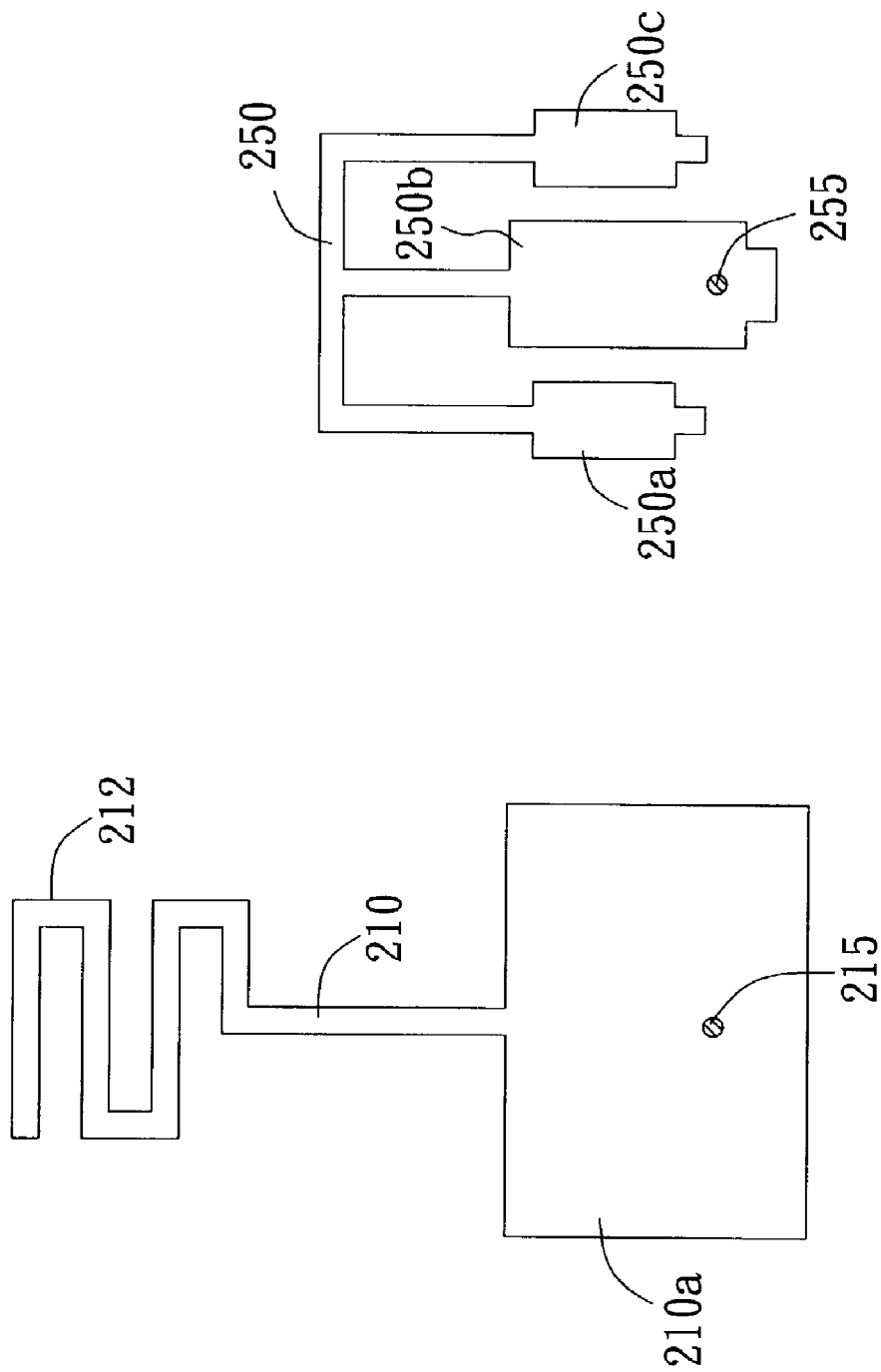
FIG. 3 is a schematic diagram for the positive electrode and the negative electrode illustrated in FIG. 2.

Please refer to FIG. 2, a structural diagram for the resonator 10 illustrated in FIG. 1. The resonator 10 comprises a positive electrode 210, a dielectric material 230 and a negative electrode 250, wherein the dielectric material 230 can be fiberglass with the positive electrode 210 and the negative electrode 250 being formed on the front side and the rear side of the dielectric material 230 respectively (two opposite sides of the dielectric material 230). The resonator 10 can be the flame-retardant-4 (FR-4) printed circuit board, which is made of woven glass reinforced epoxy resin. Besides, the terminal 215 on the positive electrode 210 and the terminal 255 on the negative electrode 250 are used to transmit high frequency signals. The phase for the terminal 215 and the phase for the terminal 255 have a difference of 180 degrees. The terminal 215 is also known as the loading terminal for high frequency signals. It is noteworthy that the positive electrode 210 further comprises a bending section 212 (as shown in FIG. 3), which is conductive. Moreover, the positive electrode 210 has a positive polarity regulating piece 210a while the negative electrode 250 has negative polarity regulating pieces 250a, 250b and 250c (as shown in FIG. 3). The capacitance effect existing between these regulating pieces regulates impedance matching and the phase as well, so that the radiation effect can be optimized. Apart from that, the total winding wire length of the positive electrode 210 can be adjusted according to the necessary operating frequency, so the portable wireless device can be applicable within a specific bandwidth.

Please refer to FIG. 3, a schematic diagram for the positive electrode 210 and negative electrode 250 illustrated in FIG. 2. The positive electrode 210 has a single positive polarity regulating piece 210a while the negative electrode 250 has three negative polarity regulating pieces 250a, 250b, and 250c which are smaller than the positive polarity regulating piece 210a. In order that the three negative polarity regulating pieces can be differentiated, negative polarity regulating piece 250b, the larger and middle one, is called the "main adjusting piece", while negative polarity regulating piece 250a and 250c, the two smaller ones besides, are called the "auxiliary regulating pieces". Since positive polarity regulating piece 210a and negative polarity regulating pieces 250a, 250b, 250c are separated by the dielectric material 230 with negative polarity regulating pieces 250a, 250b, 250c being installed on the dielectric material 230 opposite to the rear side of positive polarity regulating piece 210a, capacitance effects exist between positive polarity regulating piece 210a and negative polarity regulating pieces 250a, 250b, 250c. In other words, capacitance C1 exists between positive polarity regulating piece 210a and negative polarity regulating piece 250a; capacitance C2 exists between positive polarity regulating piece 210a and negative polarity regulating piece 250b; capacitance C3 exists between positive polarity regulating piece 210a and negative polarity regulating piece 250c. Furthermore, capacitance C4 exists between negative polarity regulating piece 250a and 250b; capacitance C5 exists between negative polarity regulating piece 250b and 250c. Totally, there are 5 capacitances effects available for regulating. Impedance matching and phase can be changed by regulating the size of negative polarity regulating pieces 250a, 250b, and 250c, so the optimum radiation effect can be obtained with high accuracy.

Figure 4:
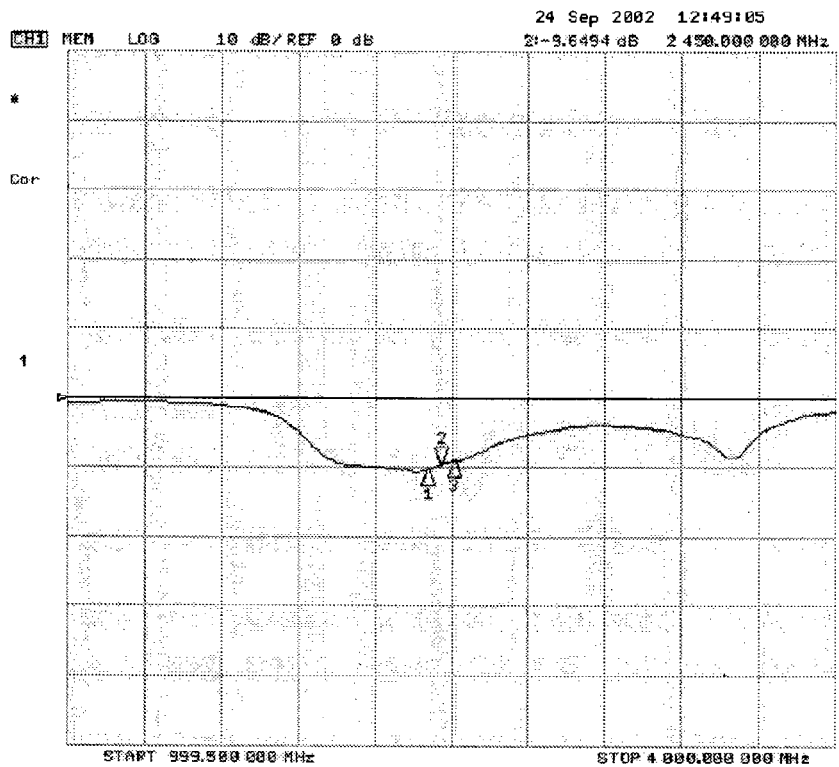
FIG. 4 is the result of return loss measurement before a resonator has been installed into a portable wireless device.

After that, a real portable wireless device can be manufactured according to the results obtained using the high frequency structure simulation; the performance of the portable wireless device operating within the same bandwidth with and without the installment of a resonator device are measured and compared. Please refer to FIG. 4, the result of return loss measurement before the resonator 10 has been installed into the portable wireless device. This is the operating characteristic for the resonator 10 alone without any conductor elements being installed nearby. According to the result of the measurement, label 2 shows a return loss of 9.6494 dB under an operating frequency of 2.45 GHz. Such performance is not an ideal one. Label 1 shows a return loss of 10.249 dB under an operating frequency of 2.4 GHz; label 3 shows a return loss of 9.0136 dB under an operating frequency of 2.5 GHz. Neither label 1 nor label 3 has an ideal performance.

Figure 5:
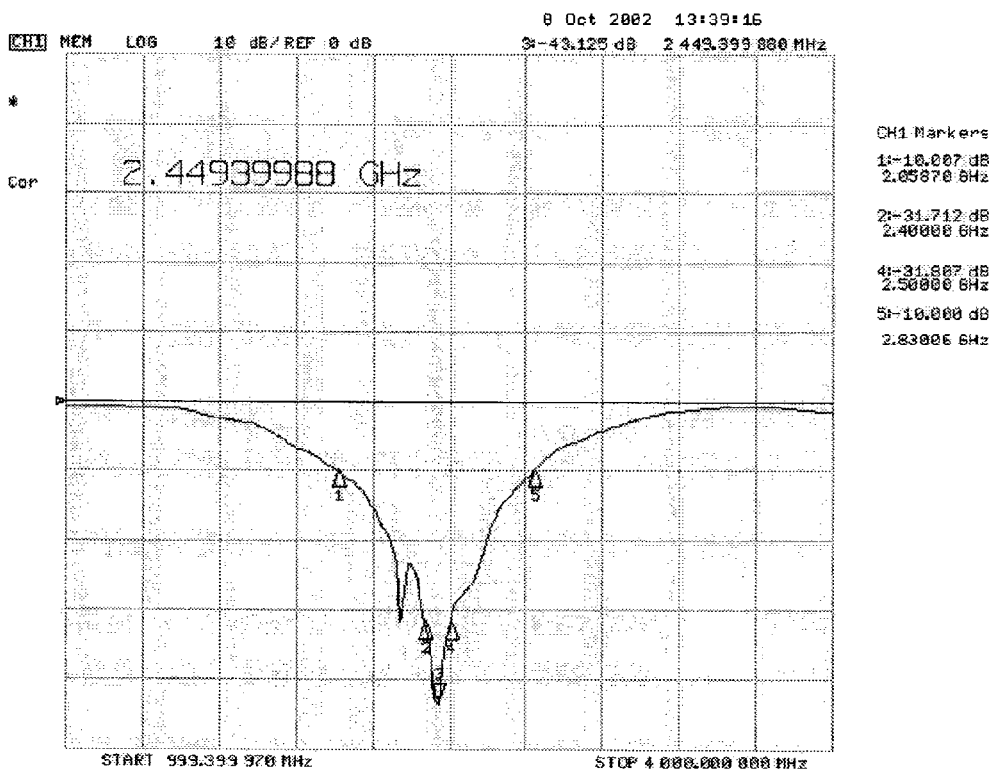
FIG. 5 is the result of return loss measurement after a resonator has been installed into a portable wireless device.

Please refer to FIG. 5, the result of return loss measurement after the resonator 10 has been installed into the portable wireless device. Now the resonator 10 has already been installed into the portable wireless device with conductor elements such as the battery 130, the card slot 150, the multimedia socket 170 and the circuit board 190 being installed nearby. According to the result of measurement, label 3 shows a return loss of 43.125 dB under an operating frequency of 2.45 GHz; label 2 shows a return loss of 31.712 dB under an operating frequency of 2.4 GHz; label 4 shows a return loss of 31.807 dB under an operating frequency of 2.5 GHz. All of these performances are excellent. It can be seen from label 1 and label 5 that the high frequency characteristic is particularly excellent within the operating bandwidth of 2.05870~2.83006 GHz (about 771.4 MHz).

Figure 6:
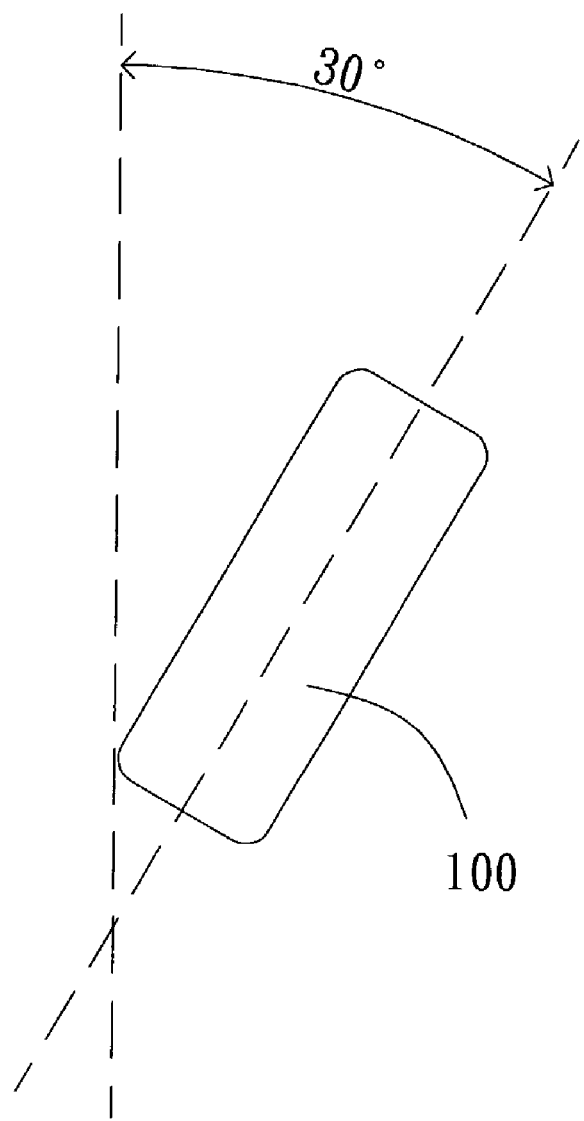
FIG. 6 is a schematic diagram illustrating an included angle of 30° plane.

Table 1 summarizes the results of gain measurement for a number of important reference planes at different operating frequency. The data in the group of 30° plane needs to be elaborated further. When talking using a portable wireless device 100, normally people would hold the portable wireless device 100 at their hand with an included angle of 30° being formed between the portable wireless device and the vertical line as shown in FIG. 6. From the actual measurement, when held at the measurement plane of 30°, the portable wireless device has better performance than other measurement planes.

TABLE 1

|  |  | Frequency (GHz) | | |
| --- | --- | --- | --- | --- |
|  |  | 2.40 | 2.45 | 2.50 |
| 30° plane | Peak gain | 1.85 | 1.15 | 1.48 |
|  | Average gain | −3.94 | −4.57 | −3.85 |
| XY plane | Peak gain | −0.58 | −1.15 | −1.55 |
|  | Average gain | −4.41 | −5.08 | −4.43 |
| YZ plane | Peak gain | −1.31 | −1.82 | −1.76 |
|  | Average gain | −4.89 | −5.46 | −5.10 |
| XZ plane | Peak gain | −2.96 | −3.52 | −3.15 |
|  | Average gain | −6.47 | −7.17 | −6.40 |

The portable wireless device disclosed in the above embodiment of the invention contributes necessary radiation field together a resonator and other conductor elements, so that conductor elements will not degrade the radiating characteristic of an antenna. To the contrary, conductor elements even provide the portable wireless device with a better performance of high frequency characteristic.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable wireless device with a resonance bandwidth, wherein the portable wireless device comprises:
   a conductor element; and
   a resonator operating in the resonance bandwidth with a first regulating piece and a second regulating piece, wherein a capacitance effect exists between the first regulating piece and the second regulating piece and the second regulating piece comprises a main regulating piece, a first auxiliary regulating piece and a second auxiliary regulating piece with the first auxiliary regulating piece and the second auxiliary regulating piece being disposed at the two sides of the main regulating piece and having capacitance effect with the main regulating piece respectively;
   wherein when the resonator resonates, the resonator generates a radiation field for the portable wireless device by coupling energy to the conductor element;
   wherein the radiation field generated by the resonator in resonance is adjusted by regulating the capacitance effect between the first regulating piece and the second regulating piece and adjusting a winding wire length of the resonator.

2. A portable wireless device according to claim 1, wherein the resonator comprises:
   a dielectric material;
   a positive electrode, wherein the positive electrode is formed on the dielectric material and has the first regulating piece; and
   a negative electrode, wherein the negative electrode is formed on the dielectric material and has the second regulating piece with capacitance effect existing between the first regulating piece and the second regulating piece.

3. A portable wireless device according to claim 2, wherein the conductor element comprises a circuit board.

4. A portable wireless device according to claim 2, wherein the conductor element comprises a battery.

5. A portable wireless device according to claim 2, wherein the conductor element comprises a card slot.

6. A portable wireless device according to claim 2, wherein the conductor element comprises a multimedia socket.

7. A portable wireless device according to claim 6, wherein the multimedia socket is a microphone socket.

8. A portable wireless device according to claim 6, wherein the multimedia socket is an earphone socket.

9. A portable wireless device according to claim 2, wherein the conductor element comprises a housing with a coating of conductive material.

10. A portable wireless device according to claim 1, wherein the resonator comprises a flame-retardant-4 (FR-4) printed circuit board.

11. A portable wireless device with a resonance bandwidth, the portable wireless device comprises:
    a conductor element; and
    a resonator comprising:
       a dielectric material;
       a positive electrode with a winding wire length, wherein the positive electrode is formed on the dielectric material and has a positive polarity regulating piece; and
       a negative electrode, wherein the negative electrode is formed on the dielectric material and has a negative polarity regulating piece with capacitance effect existing between the positive polarity regulating piece and the negative polarity regulating piece and the negative polarity regulating piece comprises a main regulating piece, a first auxiliary regulating piece and a second auxiliary regulating piece with the first auxiliary regulating piece and the second auxiliary regulating piece being disposed at the two sides of the main regulating piece and having capacitance effect with the main regulating piece respectively;
    wherein when the resonator resonates, the resonator generates a radiation field for the portable wireless device by coupling energy to the conductor element;
    wherein the radiation field generated by the resonator in resonance is adjusted by regulating the capacitance effect between the positive polarity regulating piece and the negative polarity regulating piece and adjusting the winding wire length.

12. A portable wireless device according to claim 11, wherein the dielectric material is fiberglass.

13. A portable wireless device according to claim 11, wherein the portable wireless device is a personal digital assistant (PDA).

14. A portable wireless device according to claim 11, wherein the portable wireless device is a mobile phone.

15. A portable wireless device according to claim 11, wherein the portable wireless device is a notebook computer.

16. A portable wireless device according to claim 11, wherein the conductor element comprises a circuit board.

17. A portable wireless device according to claim 16, wherein the conductor element comprises a battery.

18. A portable wireless device according to claim 17, wherein the conductor element further comprises a card slot which is used to receive the energy generated by the coupling of the resonator and generates a radiation field for the portable wireless device together with the battery and the circuit board.

19. A portable wireless device according to claim 18, wherein the card slot is a memory card slot.

20. A portable wireless device according to claim 18, wherein the card slot is an I/O card slot.

21. A portable wireless device according to claim 17, wherein the conductor element further comprises a multimedia socket used to receive the energy generated by the coupling of the resonator and generates a radiation field for the portable wireless device together with the battery and the circuit board.

22. A portable wireless device according to claim 21, wherein the multimedia socket is a microphone socket.

23. A portable wireless device according to claim 21, wherein the multimedia socket is an earphone socket.

24. A portable wireless device according to claim 17, further comprising an housing, which, having a coating of conductive material, is used to receive the energy generated by the coupling of the resonator and generates a radiation field for the portable wireless device together with the battery and the circuit board.

* * * * *